Aug. 8, 1950     T. C. WILLIAMSON     2,518,409

REGENERATION OF GRANULAR ADSORBENTS

Filed June 26, 1947

Fig. 1.

Fig. 2.

INVENTOR.
Thomas C. Williamson
BY Nathaniel Ely
ATTORNEY

Patented Aug. 8, 1950

2,518,409

UNITED STATES PATENT OFFICE 2,518,409

REGENERATION OF GRANULAR ADSORBENTS

Thomas C. Williamson, Jackson Heights, N. Y., assignor to The Lummus Company, New York, N. Y., a corporation of Delaware Application June 26, 1947, Serial No. 757,263

17 Claims. (Cl. 34—9)

This invention relates to the drying of liquids by direct contact with a granular adsorbent and more particularly to a method of regenerating the spent granular adsorbent.

It is common practice to dry gases and liquids by passing them through beds of granular adsorbents which do not react chemically with the material being dried and which are usually capable of being regenerated by heating in situ. Exemplary of adsorbents of this character are activated alumina, Porocel, bauxite, silica gel, and activated clays. The operating cycle for such adsorbents is essentially as follows:

First, assuming the adsorbent bed is ready for reactivation, the adsorbent is heated to 350° F. or more, by means of an imbedded heating element such as a steam coil or electric heater, or by means of a hot inert gas flowing through the bed, or by the combination of a heating element and a hot inert gas.

Second, the temperature of the bed is held at its reactivation temperature until the moisture content is reduced sufficiently to reactivate the adsorbent.

Third, the adsorbent is cooled by means of an imbedded cooling element such as a water cooled coil or by flowing a cool dry gas through the bed or by passing an inert liquid through the reactivated adsorbent, and then the bed is ready to be put back on stream.

While it has been the practice to cool the hot regenerated bed either by means of a cooling coil imbedded in the adsorbent or by means of a cool, dry gas being passed through the adsorbent, the use of the cooling coil is inefficient and expensive because of the poor heat conductivity of the granular material. On the other hand, if a gas is circulated for cooling, it must be dry or it will reduce the adsorptive capacity by losing moisture to the adsorbent. Since it is seldom that a dry gas is available, it is usually necessary to cool and dry the gas in a series of additional driers and coolers. Even when a dry gas is available, it is still not a very good drying agent because of its low specific heat.

The most efficient method of cooling the hot granular bed is to evaporate a dry, inert liquid in the bed, thereby taking advantage of the high latent heat of the liquid, the liquid used ordinarily being a different liquid than that dried in the system. When such a liquid is used it is usually cycled between the granular bed and its own cooling system exterior to the adsorbent bed. While such a system has been tried, it has not proven entirely satisfactory because of the danger of disrupting the granular bed when the vapors are formed.

In accordance with my invention, I take advantage of this method of cooling by evaporation of the liquid in the bed and by a special arrangement of apparatus, carry out the cooling efficiently and quickly without disrupting the bed. I also find it possible to use the liquid being dried as the evaporating liquid thereby avoiding the complications of a supplementary liquid coolant.

Generally, the liquid charged to the driers falls into three broad but distinct classifications. In the first, the liquid has a boiling point at or above the temperature to which the granular bed is heated for reactivation (this invention is not concerned with this first group of liquids). In the second, the liquid being dried has a boiling point just below the temperature to which the granular bed is heated for reactivation, said boiling point taken at the operating pressure which is the pressure at which the liquid is dried. In the third case, the liquid has a boiling point taken at the same pressure, just above the temperature to which it is desired to cool the granular bed, that is, just above the operating temperature. In the second case, the liquid is in contact with the bed only a short time before the temperature of the bed falls below the point at which the liquid will vaporize. Therefore, for a large part of the cooling period the cooling effect of the liquid will be due to its specific heat and not to its latent heat. Accordingly, the liquid must be dry for otherwise it would lose a large amount of water to the adsorbent while it is in the liquid phase and the net result would be an increase in the length of the cooling period due to the heat of adsorption liberated by the moisture adsorbed. In the third case, however, where the liquid is relatively low boiling, the liquid will vaporize on contact with the bed during most of the cooling period. Therefore, it need not be dry since the cooling period will be relatively short and the amount of moisture lost to the adsorbent during this period will be negligible.

It is the principal object of my invention, therefore, to provide a new and practical method of cooling a hot regenerated granular adsorbent bed with the liquid charged to the drier where said liquid has a boiling point below the temperature of the reactivation of the adsorbent.

It is a further object of my invention to cool such a bed without disrupting the bed structure as a result of the rapid expansion of the vapors in bed.

Further objects and advantages of my invention will appear from the following description of a preferred form of embodiment thereof taken in connection with the attached drawing in which:

Figure 1 is a flow diagram of a system wherein a hot granular adsorbent bed may be cooled in direct contact with the liquid charge to the system where the liquid charge boils at a temperature near the operating temperature of the drier, and Figure 2 is a modification of the system shown in Figure 1 adapted for drying a liquid having a boiling point just below the temperature of reactivation of the adsorbent.

It is the practice in drying liquids or gases by means of granular adsorbents to use at least two drying vessels in parallel so that while one is "on stream," that is, while it is actually being used to dry a charge liquid, the adsorbent in the other vessel may be reactivated. Depending on the nature of the liquid being dried, the pressure in the "on stream" vessel is usually greater than the pressure in the other vessel undergoing reactivation. In Figure 1, I have shown a drying system typical of those systems using driers in parallel but especially adapted for the purposes of my invention wherein the liquid to be dried has a boiling point just above the temperature to which it is desired to cool the granular bed, that is, just above the operating temperature.

Assuming the system to be in operation so that drier I is on stream, the liquid being charged to the drier through pipe 9 is passed through valve 6, and through the body of granular drying material in drier I. The dried liquid leaves the drier I through line 14, valve 8 and thence is passed to discharge line 10. As drier II is to be reactivated, all valves other than 6 and 8 will be closed.

To reactivate the spent adsorbent in drier II, it must first be heated sufficiently to drive off the adsorbed moisture. This is done by means of the steam coil 16 imbedded in the adsorbent in conjunction with a hot, dry, inert gas which is passed through the bed at the same time. A suitable gas such as flue gas may be charged to the vessel through line 11 for this purpose. By opening valve 3, the flue gas, along with the moisture driven from the adsorbent by the heat, is passed from the system through the purge line 12. When the bed is sufficiently dry as indicated by the moisture content of the gases in the purge line 12, valve 3 is shut off and the adsorbent in the vessel is then ready to be cooled.

In Figure 1 valve 1 is by-pass valve of a much lower capacity than the main flow valves 5 and 7. This valve is so sized that when fully open but a small metered or controlled amount of the liquid charge from line 9 will flow to the drier. To cool the hot adsorbent in drier II valves 1 and 3 are opened so that the small amount of charge liquid will flow to the drier II. This liquid on contacting the hot adsorbent will vaporize rapidly and the expanding vapors will force the inert gases through the valve 3 to the purge line 12. Since valve 1 is sized to deliver only a metered amount of the liquid to the drier the rate of vapor formation in the drier will be small thereby preventing disruption of the granular bed. This charge liquid may be introduced either to the top of drier II through the distributor 19, as shown, so that as it penetrates and evaporates, it will progressively cool the bed and only a minimum of liquid will actually be required or the same liquid may be introduced at any other point on the drier.

When the drier II has been completely purged of inert gases and moisture, valve 3 is closed, and the pressure in the drier is allowed to build up until it is equal to that in line 10 which is substantially the pressure in the on-stream drier I. Valve 7 is then opened and liquid is passed through valve 1 until all further vaporization of the liquid in drier II has stopped, that is, until the temperature of the bed has fallen below the boiling point of the liquid at the pressure in the bed which temperature will be at some point above the normal atmospheric boiling point of the liquid being dried. When that temperature is reached valve 1 is closed and valve 5 is opened so that the liquid from line 9 may flow freely to the drier II until the bed is at the desired on-stream or operating temperature. Valves 5 and 7 are then closed and the drier II is ready to be put back on stream.

When it is desired to reactivate the adsorbent in drier I, this series of operations is repeated with valve 2 which is a small valve like valve 1 and valves 4, 6, and 8 together with a steam coil 17 and flue gas through line 13 as in the former case.

As indicated in Figure 1, there are two liquid trap sections 14 and 15 in the lines leading from each drier. These are necessary to prevent any liquid that might condense at the valves 7 and 3 or 8 and 4 during the first part of the cooling period, from flowing back into the drier being cooled. If this were to happen the sudden increase in the volume of vapors due to the added liquid might disrupt the bed as explained above.

In the case just discussed where the liquid to be dried has a boiling point just above the operating temperature of the adsorbent, it is entirely practical to use that liquid as the coolant. Since, as heretofore mentioned, most of the cooling is effected by evaporation, only a small amount of cooling liquid is needed. Thus, only a very small amount of moisture will be adsorbed from the "wet" liquid by the adsorbent during the cooling period.

As a specific example, normal butane may be dried in such a system by passing it in direct contact with an adsorbent bed such as Porocel, a natural clay with a high per cent of bauxite. In this case, the bed during the on-stream period is held at a temperature of about 90° F. and a pressure of 37 p. s. i. g. under which conditions the normal butane is a liquid having a boiling point of 100° F. Since the Porocel bed must be heated to 400° F. to reactivate it, it is obvious that normal butane may be considered as a liquid having a boiling point near the on-stream temperature of the bed and thus the system of Figure 1 is applicable.

Assuming that the drier I of Figure 1 is on-stream and the bed of drier II has just been heated to 400° F. by means of the steam coils and hot flue gas, then to cool the adsorbent by-pass valve 1 and valve 3 are opened, and a small amount of the butane allowed to flow to the bed. On contacting the hot bed, the butane will expand immediately, forcing the flue gas and moisture through valve 3 to the purge line. When the vessel has been purged, valve 3 is closed and the butane is vaporized in the vessel until the pressure has built up to 37 p. s. i. g. which is approximately the pressure in line 10. Valve 7 is then opened and, when the temperature of the bed falls below 100° F., valve 1 is closed and valve 5 is opened. Liquid butane is then passed through the bed at its full rate of flow until the temperature has fallen to about 90° F. Valves 5 and 7 are closed and the bed is then ready to go on stream.

In an actual plant installation used for drying a low boiling liquid charge and using a cool, dry, inert gas as the coolant for the hot adsorbent instead of the liquid being cooled, the cooling period was approximately 24 hours as compared with an onstream period of 8 hours and a reactivation period of 2 hours. Such a drying system was modified according to the principles set forth above and the cooling period was reduced to 2 hours with an on-stream period of 8 hours and a reactivation period of 2 hours.

When the liquid being dried has a boiling point near the temperature to which the bed is heated for reactivation the system shown in Figure 2 must be used. Since, in this case, only a small amount of cooling is effected by evaporation and most of the cooling is a result of direct transfer of heat from the adsorbent to the liquid as such, it is necessary that the liquid coolant be dry otherwise too much water is lost to the adsorbent.

Referring now to Figure 2 and assuming that drier I is on stream with feed from line 35 passing through valve 23, drier I, thence through trap 39, valve 29 and out through line 34, then all other valves in the system will be closed at the time when drier II is ready to be reactivated. As before, valves 25 and 26 are of a relatively small size and low capacity compared to the rest of the valves shown and sized to pass only a small, metered or controlled amount of liquid. Also as before, the adsorbent beds are heated by means of the heating coils 36 and 37 and by passing a hot inert gas through lines 19 or 20 to the respective driers. When the bed of drier II is being heated, valve 32 is open and the hot flue gas carrying the entrained moisture given off by the adsorbent is passed from the system through the purge line 33. When the adsorbent bed has been fully reactivated as indicated by the moisture content of the gases in line 33, the by-pass valve 26 is opened and a small amount of the dry liquid from the discharge of drier I is passed to drier II through the distributor 28. The liquid on contacting the hot material will vaporize and expand rapidly. Vaporization is continued until the pressure at the valve 30 is substantially equal to the pressure in line 34. Valve 30 is then opened and liquid is passed through valve 26 until vaporization has stopped and the drier is completely filled with unvaporized liquid. At that point valve 26 is closed, valve 22 is opened and valve 29 is closed to allow the full flow of the dry liquid to pass through the dryer II. This is continued until the temperature of the adsorbent in this drier has fallen to the desired operating temperature. When that temperature is reached, drier II is ready to go on stream. When drier I is taken off stream, adsorbent in the drier is reactivated in the same manner by means of the corresponding valves 21, 23 and 31 and the by-pass valve 25 along with its steam coil 37 and purge line 20. In Figure 2, the raised section 39 and 38 of the lines leaving driers I and II, respectively, serve the same purpose as the trap sections 14 and 15 in Figure 1.

If it be assumed that the operating and reactivating temperatures and pressures in this second case are the same as in the first case, the second case is preferable for liquids such as toluene, for example, that have a boiling point near the temperature (400° F.) to which the bed is heated for reactivation. In such case, there is no substantial deactivation of the bed by the cooling action of the dried liquid.

Having thus fully explained and described my invention what I claim and desire to obtain by Letters Patent is:

1. The method of reactivating a bed of adsorbent which has adsorbed a component from a liquid charge, which comprises heating the adsorbent to a reactivation temperature sufficient to drive off the adsorbed component, applying a stream of cooling liquid to the adsorbent, said cooling liquid comprising an unadsorbed component of said liquid charge, controlling the flow of cooling liquid to cool said adsorbent by evaporation without disrupting the adsorbent bed, allowing the adsorbent bed to reach a temperature below the flash point of the cooling liquid entering the bed, and thereafter passing larger controlled amounts of said cooling liquid into contact with the adsorbent until said bed is reduced to its operating temperature.

2. The method of reactivating a bed of adsorbent claimed in claim 1 in which the adsorbent is primarily adapted to remove moisture from the liquid charge.

3. The method of reactivating a bed of adsorbent claimed in claim 2 in which the cooling liquid has a boiling point just above the operating temperature of the adsorbent bed.

4. The method of reactivating a bed of adsorbent claimed in claim 3 in which the cooling liquid is butane and the optimum adsorption temperature is 90° F.

5. The method of reactivating a bed of adsorbent claimed in claim 4 in which the adsorbent is reactivated at a temperature of approximately 400° F.

6. The method of reactivating a bed of adsorbent claimed in claim 2 in which the cooling liquid has a boiling point just below the temperature of reactivation of the adsorbent bed.

7. The method of reactivating a bed of adsorbent claimed in claim 6 in which the cooling liquid is first dried before being passed to the adsorbent.

8. The method of reactivating a bed of adsorbent claimed in claim 7 wherein the cooling liquid is a hydrocarbon having a boiling point near and below the temperature of reactivation of the bed.

9. The method of reactivating a bed of adsorbent claimed in claim 1 in which the cooling liquid is untreated liquid charge having a boiling point just below the temperature to which the bed is heated for reactivation.

10. The method of reactivating a bed of adsorbent claimed in claim 1 in which the cooling liquid is from an alternate adsorbent bed and is free of adsorbable material, said cooling liquid having a boiling point just above the temperature to which it is desired to cool the bed.

11. The method of quickly cooling to operating temperature an adsorbent which has adsorbed a component from a liquid charge and which has been subsequently heated for desorption, which comprises introducing to the heated adsorbent a liquid comprising an unadsorbed component of said liquid comprising an unadsorbed component of said liquid charge, controlling the rate of introduction of said liquid whereby it is slowly vaporized thereby increasing the vapor pressure on said adsorbent without disrupting the bed, allowing the pressure on the adsorbent to increase until it is substantially equal to the desired treating pressure, maintaining said pressure until the temperature of the adsorbent is below the boiling point of the liquid at that pressure, simultaneously preventing the return to said adsorbent of condensate of said vaporized liquid, and thereafter passing said liquid through the adsorbent until said adsorbent is at its desired treating temperature.

12. The method of quickly cooling a reactivated adsorbent claimed in claim 11 in which the liquid is untreated liquid charge carrying the adsorbed component, said liquid having a boiling point just below the temperature to which the bed is heated for reactivation.

13. The method of quickly cooling a reactivated adsorbent claimed in claim 11 in which the liquid is treated liquid charge from an alternate adsorbent bed and is free of adsorbable material, said liquid having a boiling point just above the temperature to which it is desired to cool the bed.

14. The method of quickly cooling to operating temperature an adsorbent which has adsorbed a component from a liquid charge and which has been subsequently heated for desorption, which comprises introducing to the heated adsorbent a non-aqueous liquid, controlling the rate of introduction of said liquid whereby it is slowly vaporized thereby increasing the vapor pressure on said adsorbent without disrupting the bed, allowing the pressure on the adsorbent to increase until it is substantially equal to the desired treating pressure, maintaining said pressure until the temperature of the adsorbent is below the boiling point of the liquid at that pressure, simultaneously preventing the return to said adsorbent of condensate of said vaporized liquid and thereafter passing larger quantities of said non-aqueous liquid through the bed until said adsorbent is at its operating temperature.

15. The method of reactivating a bed of adsorbent which has been used to dry a liquid hydrocarbon charge, which comprises heating the adsorbent to a reactivation temperature sufficient to drive off the adsorbed water, applying a stream of liquid hydrocarbon to the adsorbent, said liquid hydrocarbon comprising an unadsorbed component of said liquid hydrocarbon charge, controlling the flow of liquid hydrocarbon to cool said adsorbent by evaporation without disrupting the adsorbent bed, allowing the adsorbent bed to reach a temperature below the flash point of said liquid hydrocarbon entering the bed, and thereafter passing larger controlled amounts of said liquid hydrocarbon into contact with the adsorbent until said bed is reduced to its operating temperature.

16. The method of reactivating a bed of adsorbent which has been used to dry a liquid hydrocarbon charge claimed in claim 15 wherein the liquid hydrocarbon charge boils at a temperature just above the operating temperature of the adsorbent bed.

17. The method of reactivating a bed of adsorbent which has been used to dry a liquid hydrocarbon charge claimed in claim 15 wherein the liquid hydrocarbon charge boils near to and below the temperature of reactivation of the bed.

THOMAS C. WILLIAMSON.

REFERENCES CITED

The following references are of record in the file of this patent:

UNITED STATES PATENTS

| Number | Name | Date |
|---|---|---|
| 2,037,685 | Holden | Apr. 14, 1936 |
| 2,323,524 | Downs, Jr. | July 6, 1943 |